US012590803B2

(12) United States Patent　　(10) Patent No.:　US 12,590,803 B2
Guo et al.　　(45) Date of Patent:　Mar. 31, 2026

(54) METHOD FOR PLANNING PATH NAVIGATION, STORAGE MEDIUM AND ELECTRONIC DEVICE

(71) Applicants: GREE ELECTRIC APPLIANCES, INC. OF ZHUHAI, Zhuhai (CN); LEAYUN TECHNOLOGY CO. LTD. OF ZHUHAI, Zhuhai (CN)

(72) Inventors: Boyang Guo, Zhuhai (CN); Gao Chen, Zhuhai (CN); Yanyu Chen, Zhuhai (CN); Yaqi Ma, Zhuhai (CN)

(73) Assignees: GREE ELECTRIC APPLIANCES, INC. OF ZHUHAI, Zhuhai (CN); LEAYUN TECHNOLOGY CO., LTD. OF ZHUHA, Zhuhai (CN)

( * ) Notice: Subject to any disclaimer, the term of this patent is extended or adjusted under 35 U.S.C. 154(b) by 168 days.

(21) Appl. No.: 18/572,310

(22) PCT Filed: Apr. 21, 2022

(86) PCT No.: PCT/CN2022/088227
§ 371 (c)(1),
(2) Date: Dec. 20, 2023

(87) PCT Pub. No.: WO2023/024539
PCT Pub. Date: Mar. 2, 2023

(65) Prior Publication Data
US 2024/0230338 A1　Jul. 11, 2024

(30) Foreign Application Priority Data
Aug. 24, 2021　(CN) ......................... 202110976430.7

(51) Int. Cl.
*G01C 21/20*　(2006.01)
*A47L 11/24*　(2006.01)
*A47L 11/40*　(2006.01)

(52) U.S. Cl.
CPC ............ *G01C 21/206* (2013.01); *A47L 11/24* (2013.01); *A47L 11/4011* (2013.01); *A47L 2201/04* (2013.01)

(58) Field of Classification Search
CPC .... G01C 21/206; A47L 11/24; A47L 11/4011; A47L 2201/04
See application file for complete search history.

(56) References Cited

U.S. PATENT DOCUMENTS

| | | | | |
|---|---|---|---|---|
| 2018/0059682 A1* | 3/2018 | Thode | .................. | G05D 1/0274 |
| 2019/0208695 A1* | 7/2019 | Graf Plessen | ....... | A01B 69/008 |
| 2020/0132467 A1* | 4/2020 | Borovac | .............. | G01C 21/203 |

FOREIGN PATENT DOCUMENTS

| | | |
|---|---|---|
| CN | 106681335 A | 5/2017 |
| CN | 106840169 A | 6/2017 |

(Continued)

OTHER PUBLICATIONS

CN107491068A machine translation (Year: 2017).*

(Continued)

*Primary Examiner* — Navid Z. Mehdizadeh
*Assistant Examiner* — Oliver Tan
(74) *Attorney, Agent, or Firm* — Armstrong Teasdale LLP

(57) ABSTRACT

The present disclosure relates to a method for planning a path navigation, a storage medium and an electronic device in the technical field of path navigation. The method for planning the path navigation includes: planning an initial path of a sweeping robot, performing obstacle detection on each path point on the initial path within a range of a first variable neighborhood, and recording a distance between the each path point and an obstacle; segmenting the initial path according to the distance between the each path point and the obstacle; calculating a path offset of a segmented initial (Continued)

path to obtain an offset path; and performing smoothing processing on the offset path to obtain a final path.

17 Claims, 4 Drawing Sheets

(56) References Cited

FOREIGN PATENT DOCUMENTS

| CN | 107491068 | A | * | 12/2017 | ........... G05D 1/0217 |
|----|-----------|---|---|---------|------------------------|
| CN | 109521763 | A |   | 3/2019  |                        |
| CN | 109579854 | A |   | 4/2019  |                        |
| CN | 111428919 | A |   | 7/2020  |                        |
| CN | 112148003 | A |   | 12/2020 |                        |
| CN | 112327856 | A |   | 2/2021  |                        |
| CN | 112987740 | A |   | 6/2021  |                        |
| CN | 113534818 | A |   | 10/2021 |                        |
| WO | 2019045293 | A1 |  | 3/2019  |                        |

OTHER PUBLICATIONS

International Search Report for PCT/CN2022/088227 dated Jul. 19, 2022, 5 pages.
First Office Action for Chinese Patent Application No. 202110976430.7 issued on Nov. 25, 2022, 8 pages.

* cited by examiner

Fig. 2

Obstacle

R    D d

Segmented
path

Offset path

C

Obstacle

Initial path                 Final path

METHOD FOR PLANNING PATH NAVIGATION, STORAGE MEDIUM AND ELECTRONIC DEVICE

CROSS-REFERENCE TO RELATED APPLICATION

This application is a U.S. National Phase Application of International Patent Application No. PCT/CN22/88227, filed Apr. 21, 2022, which claims the priority of Chinese Patent Application 202110976430.7, filed on Aug. 24, 2021, and entitled "Method and Apparatus for Planning Path Navigation and, Storage Medium and Electronic Device", the entire contents of which are herein incorporated by reference.

TECHNICAL FIELD

The present disclosure relates to the technical field of path navigation, and in particular to a method for planning a path navigation, a storage medium and an electronic device.

BACKGROUND

With the increasing complexity of the environment, the autonomous movement of a sweeping robot in a multi-obstacle environment is increasingly constrained by obstacles in the environment. A method for planning a path navigation of the sweeping robot mainly realizes a path planning and an autonomous movement of the sweeping robot from a start point to a target point in the environment.

In most path navigation methods known to the inventors, the sweeping robot only performs path deviation in the vicinity of an obstacle around an obstacle point plus an offset radius, such that the sweeping robot performs a plurality of steering operations in the vicinity of the obstacle, at this time, the sweeping robot stops moving and rotates in situ until a path is re-planned, which wastes a lot of time of the sweeping robot, and seriously affects the movement efficiency of the sweeping robot. Meanwhile, since the offset mode is simple, collision between the sweeping robot and other obstacles is easily caused, which damages the own structure of the sweeping robot, and increases the measurement error of a sensor mounted on the body of the sweeping robot, such that the sweeping robot cannot safely and quickly arrive at the target point.

SUMMARY

In a first aspect, the present disclosure provides a method for planning a path navigation, wherein the method includes:
planning an initial path of a sweeping robot;
performing obstacle detection on each path point on the initial path within a range of a first variable neighborhood, and recording a distance between the each path point and an obstacle;
segmenting the initial path according to the distance between the each path point and the obstacle;
calculating a path offset of a segmented initial path to obtain an offset path; and
performing smoothing processing on the offset path to obtain a final path.
In some embodiments, planning the initial path of the sweeping robot includes:
determining a start point and a target point of a path to be planned of the sweeping robot; and according to the start point and the target point of the path to be planned of the sweeping robot, planning the initial path of the sweeping robot by means of a path planning algorithm.

In some embodiments, performing obstacle detection on the each path point on the initial path within the range of the first variable neighborhood, and recording the distance between the each path point and the obstacle includes:
sequentially performing obstacle detection within the range of the first variable neighborhood starting from the first path point of the initial path;
in a cast that it is detected that there is an obstacle within the range of the first variable neighborhood of a certain path point, calculating the distance between the certain path point and the obstacle;
in a cast that it is detected that there is no obstacle within the range of the first variable neighborhood of a certain path point, recording the distance between the certain path point and the obstacle to be a quadratic power of the radius of the variable neighborhood; and
finally, obtaining the distances between all path points and corresponding obstacles thereof.

In some embodiments, segmenting the initial path according to the distance between each path point and the obstacle includes:
acquiring distances between a plurality of path points within a range of a second variable neighborhood of a current path point and corresponding obstacles thereof;
judging whether the distances between the plurality of path points and the corresponding obstacles thereof show a trend of changing from large to small and then changing from small to large;
in a case that the trend of changing from large to small and then changing from small to large occurs, recording, as an obstacle path point, a path point corresponding to the minimum distance among the distances between the plurality of path points and the corresponding obstacles thereof, and repeating above steps with a next path point as the current path;
in a case that the trend of changing from large to small and then changing from small to large does not occur, repeating above steps with a next path point as the current path;
sequentially executing above steps starting from the first path point of the initial path, so as to finally obtain a plurality of the obstacle path points; and
segmenting the initial path according to the plurality of the obstacle path points.

In some embodiments, calculating the path offset of the segmented initial path to obtain the offset path includes:
for the plurality of the obstacle path points, calculating an offset distance d of each of the plurality of the obstacle path points on an initial position according to a formula:

$$d = \sqrt{R^2 + D^2} - D$$

calculating an offset distance $d_N$ of a path point between two endpoints of each segmented path on an initial position according to a formula:

$$d_N = \frac{N}{M}\left(\sqrt{R^2 + D^2} - D\right)$$

wherein R denotes the radius of the first variable neighborhood, D denotes the distance between the obstacle path point and the corresponding obstacle thereof, M denotes a total number of initial path points between the two endpoints of the segmented initial path, N denotes a serial number of a current initial path point among all the initial path points in the segmented initial path, both R and D are greater than 0, and both M and N are integers and greater than 0;

determining a position of the obstacle path point after offset and a position of the initial path point between the two endpoints of the each segmented path according to the offset distances d and $d_N$; and obtaining the offset path of the each segmented path according to the position of the obstacle path point after offset and the position of the initial path point between the two endpoints of the each segmented path.

In some embodiments, performing smoothing processing on the offset path to obtain the final path includes:

performing smoothing processing on the offset path by means of a B-spline curve, so as to obtain the final path.

In some embodiments, the method further includes:

controlling the sweeping robot to move according to the final path.

In a second aspect, provided is an apparatus for planning a path navigation, wherein the apparatus includes:

a planning unit, configured to plan an initial path of a sweeping robot;

a detection unit, configured to perform obstacle detection on each path point on the initial path within a range of a first variable neighborhood, and recording a distance between the each path point and an obstacle;

a segmentation unit, configured to segment the initial path according to the distance between the each path point and the obstacle;

a calculation unit, configured to calculate a path offset of a segmented initial path to obtain an offset path; and a processing unit, configured to perform smoothing processing on the offset path to obtain a final path.

In a third aspect, provided is a computer-readable storage medium, wherein a computer program stored in the storage medium is executed by one or more processors, so as to implement the method according to the first aspect.

In a fourth aspect, provided is an electronic device, including a memory and a processor, wherein the memory stores a computer program, the memory and the processor are in communication connection with each other, and when executed by the processor, the computer program implements the method according to the first aspect.

BRIEF DESCRIPTION OF THE DRAWINGS

To illustrate technical solutions in the embodiments of the present disclosure or in the prior art more clearly, a brief introduction on the drawings which are needed in the description of the embodiments or the prior art is given below. Apparently, the drawings in the description below are merely some embodiments of the present disclosure, based on which other drawings may be obtained by those ordinary skilled in the art without any creative effort.

FIG. 2 is a schematic diagram of an offset path provided in an embodiment of the present disclosure;

DETAILED DESCRIPTION OF THE EMBODIMENTS

The embodiments of the present disclosure will be described in detail below in combination with the drawings and embodiments, so as to fully understand the implementation process of how the present disclosure employs technical means to solve the technical problems and achieve corresponding technical effects, and the present disclosure is implemented accordingly. The embodiments of the present disclosure and the features in the embodiments may be combined with each other on the premise of no conflict, and formed technical solutions all fall within the protection scope of the present disclosure.

As can be seen from the background art, in most of the currently proposed path navigation methods, a sweeping robot only performs path deviation in the vicinity of an obstacle around an obstacle point plus an offset radius, such that the sweeping robot performs a plurality of steering operations in the vicinity of the obstacle, at this time, the sweeping robot stops moving and rotates in situ until a path is re-planned, which wastes a lot of time of the sweeping robot, and seriously affects the movement efficiency of the sweeping robot. Meanwhile, since the offset mode is simple, collision between the sweeping robot and other obstacles is easily caused, which damages the own structure of the sweeping robot, and increases the measurement error of a sensor mounted on the body of the sweeping robot, such that the sweeping robot cannot safely and quickly arrive at a target point.

In view of this, the present disclosure provides a method for planning a path navigation, a storage medium and an electronic device, so as to solve the technical problem in the related art that a sweeping robot stops moving and rotates in situ until a path is re-planned, which wastes a lot of time of the sweeping robot, seriously affects the movement efficiency of the sweeping robot, and even results in a structural damage due to collisions.

Embodiment 1

Figure 1:
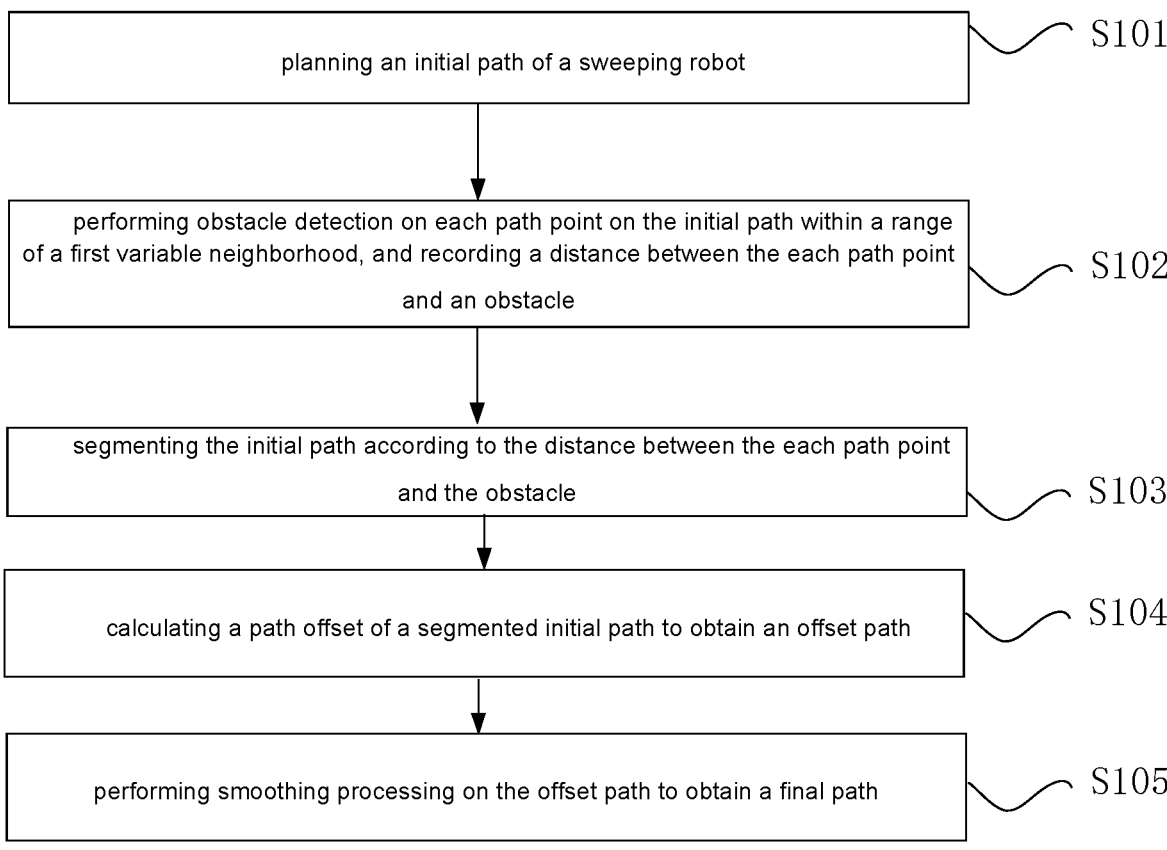
FIG. 1 is a schematic flowchart of a method for a planning path navigation provided in an embodiment of the present disclosure.

FIG. 1 is a schematic flowchart of a method for planning a path navigation provided in an embodiment of the present disclosure, and as shown in FIG. 1, the present method includes:

S101, planning an initial path of a sweeping robot;

S102, performing obstacle detection on each path point on the initial path within a range of a first variable neighborhood, and recording a distance between the each path point and an obstacle;

S103, segmenting the initial path according to the distance between the each path point and the obstacle;

S104, calculating a path offset of a segmented initial path to obtain an offset path; and S105, performing smoothing processing on the offset path to obtain a final path.

It should be noted that, in view of the problems of high time consumption and low walking efficiency caused by multiple times of steering of the sweeping robot in the vicinity of the obstacle, the present disclosure provides an improved method for planning a path navigation for the sweeping robot to be away from the obstacle. The method includes: firstly, recording a start point and a target point, and planning a passable path for connecting the start point with the target point to obtain an initial path; then, performing obstacle search on each path point in the path within the range of a variable neighborhood by using a linearly increasing thinking mode, so as to obtain all obstacle points close to the obstacle on the path; next, performing path segmentation on the initial path according to the obstacle points to obtain an segmented initial path, the segmented initial path including a plurality of segmented paths, and then performing overall offset on the segmented initial path by using a set offset strategy to obtain an offset path; and finally, performing smoothing processing on the offset path by means of a path smoothing algorithm, and controlling the sweeping robot to move according to a new path, so as to achieve the purpose that the sweeping robot can efficiently and safely arrive at the target point.

In some embodiments, planning the initial path of the sweeping robot includes:

determining a start point and a target point of a path to be planned of the sweeping robot; and according to the start point and the target point of the path to be planned of the sweeping robot, planning the initial path of the sweeping robot by means of a path planning algorithm.

It should be noted that, the path planning algorithm in the present disclosure can utilize an A-star algorithm, a D-star algorithm, a Dijkstra algorithm and a JPS algorithm path planning method, or other algorithms capable of implementing path planning are all within the scope of the present disclosure.

In some embodiments, performing obstacle detection on each path point on the initial path within the range of the first variable neighborhood, and recording the distance between each path point and the obstacle includes:

sequentially performing obstacle detection within the range of the first variable neighborhood starting from the first path point of the initial path;

in a cast that it is detected that there is an obstacle within the range of the first variable neighborhood of a certain path point, calculating the distance between the certain path point and the obstacle;

in a cast that it is detected that there is no obstacle within the range of the first variable neighborhood of a certain path point, recording the distance between the certain path point and the obstacle to be a quadratic power of the radius of the variable neighborhood; and finally, obtaining the distances between all path points and corresponding obstacles thereof.

It should be noted that, with regard to the radius of the first variable neighborhood, a reasonable value range can be set according to actual situations, and is adjusted in a linearly increasing manner, so that the neighborhood range is gradually increased, and whether there is an obstacle in the neighborhood range is detected for multiple times.

In some embodiments segmenting the initial path according to the distance between each path point and the obstacle includes:

acquiring distances between a plurality of path points within a range of a second variable neighborhood of a current path point and corresponding obstacles thereof;

judging whether the distances between the plurality of path points and the corresponding obstacles thereof show a trend of changing from large to small and then changing from small to large;

in a case that the trend of changing from large to small and then changing from small to large occurs, recording, as an obstacle path point, a path point corresponding to the minimum distance among the distances between the plurality of path points and the corresponding obstacles thereof, and repeating above steps with a next path point as the current path;

in a case that the trend of changing from large to small and then changing from small to large does not occur, repeating above steps with a next path point as the current path;

sequentially executing above steps starting from the first path point of the initial path, so as to finally obtain a plurality of the obstacle path points; and segmenting the initial path according to the plurality of the obstacle path points.

It should be noted that, with regard to the radius of the second variable neighborhood, a reasonable value range can be automatically set according to actual situations, as long as the distances between the plurality of path points and the corresponding obstacles thereof are contained within the neighborhood range, in the case that it is judged that a plurality of distances show the trend of changing from large to small and then changing from small to large, it indicates that there is a turning point within the neighborhood range, and the point is recorded. in a case that the trend does not occur, it indicates that there is no turning point within the neighborhood range, at this time, the same judgement is directly performed on the next point in the distance data until all the path points are judged, at this time, a series of recorded turning points are obtained, these turning points correspond to the path points of the initial path, so that a series of path points can be obtained, these path points are obstacle path points closest to the obstacle, and the plurality of obstacle path points divide the initial path into a plurality of segmented paths.

In some embodiments, each segmented path contains a plurality of path points, the path points are referred to as initial path points.

In some embodiments, calculating the path offset of the segmented initial path to obtain the offset path includes:

for the plurality of the obstacle path points, calculating an offset distance d of each of the plurality of the obstacle path points on an initial position according to a formula:

$$d = \sqrt{R^2 + D^2} - D$$

calculating an offset distance $d_N$ of a path point between two endpoints of the each segmented path on an initial position according to a formula:

$$d_N = \frac{N}{M}\left(\sqrt{R^2 + D^2} - D\right)$$

wherein R denotes the radius of the first variable neighborhood, D denotes the distance between the obstacle path point and the corresponding obstacle thereof, M denotes a total number of initial path points between the two endpoints of the segmented initial path, N denotes a serial number of a current initial path point among all the initial path points in the segmented initial path, both R and D are greater than 0, and both M and N are integers and greater than 0;

determining a position of the obstacle path point after offset and a position of the initial path point between the two endpoints of the each segmented path according to the offset distances d and $d_N$; and obtaining the offset path of the each segmented path according to the position of the obstacle path point after offset and the position of the initial path point between the two endpoints of the each segmented path.

It should be noted that, in the segmented paths, the start endpoint of the first segmented path is the start point of the initial path, the termination endpoint is the first obstacle path point, the start endpoints and the termination endpoints of the second segmented path to the last but two segmented paths are all obstacle path points, the start endpoint of the last segmented path is the last obstacle path point, and the termination endpoint is the termination point of the initial path, that is, the target point. In some embodiments, there are a plurality of initial path points between the start endpoint and the termination endpoint, and the offset processing of the each segmented path is that the start endpoint remains stationary, the offset distance of the termination endpoint is calculated, then the offset distance of the each initial path point contained in the segmented path is calculated according to the offset distance of the termination endpoint, and finally the offset path of the each segmented path from the start endpoint to the offset termination endpoint is obtained.

Figure 2:
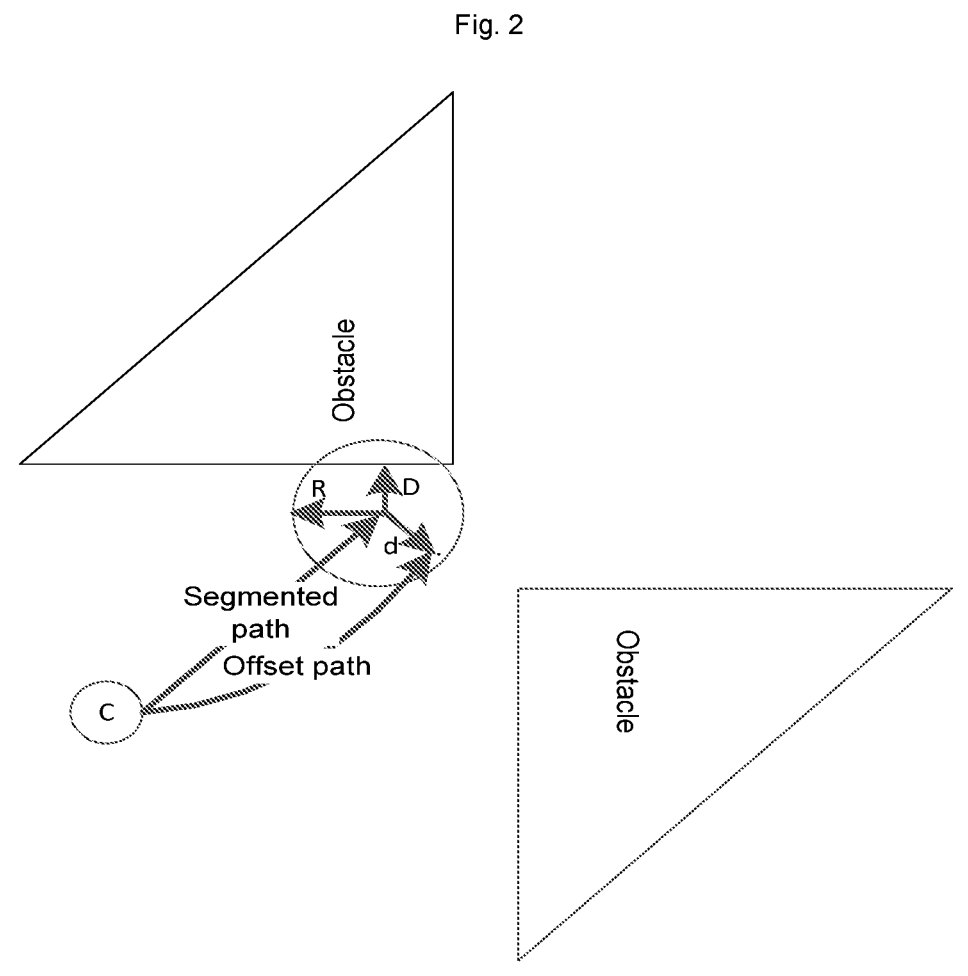

As shown in FIG. 2, it is a schematic diagram of the offset path, wherein a point C is the start endpoint of the segmented path, and the circle center of the circle in the figure is the obstacle path point, that is, the termination endpoint of the segmented path. As can be seen from FIG. 2, the start endpoint of the segmented path remains stationary, the termination endpoint deviates by a distance d, and then the offset distance of each initial path point on the segmented path is calculated. As can be seen from the formula $$d_N = \frac{N}{M}\left(\sqrt{R^2 + D^2} - D\right),$$

the offset distance of the initial path point closer to the start endpoint is smaller, the offset distance of the initial path point closer to the termination endpoint is greater, and thus the finally obtained offset path is shown in FIG. 2.

In some embodiments, performing smoothing processing on the offset path to obtain the final path includes:

performing smoothing processing on the offset path by means of a B-spline curve, so as to obtain the final path.

It should be noted that, the smoothing processing in the present disclosure includes, but is not limited to, using a B-spline curve algorithm, and other smoothing algorithms capable of implementing the smoothing processing are all within the scope of the present disclosure.

It should be further noted that, by means of the smoothing processing, the plurality of segmented paths are smoothly connected together to form a complete path, so as to serve as the final path.

Figure 3:
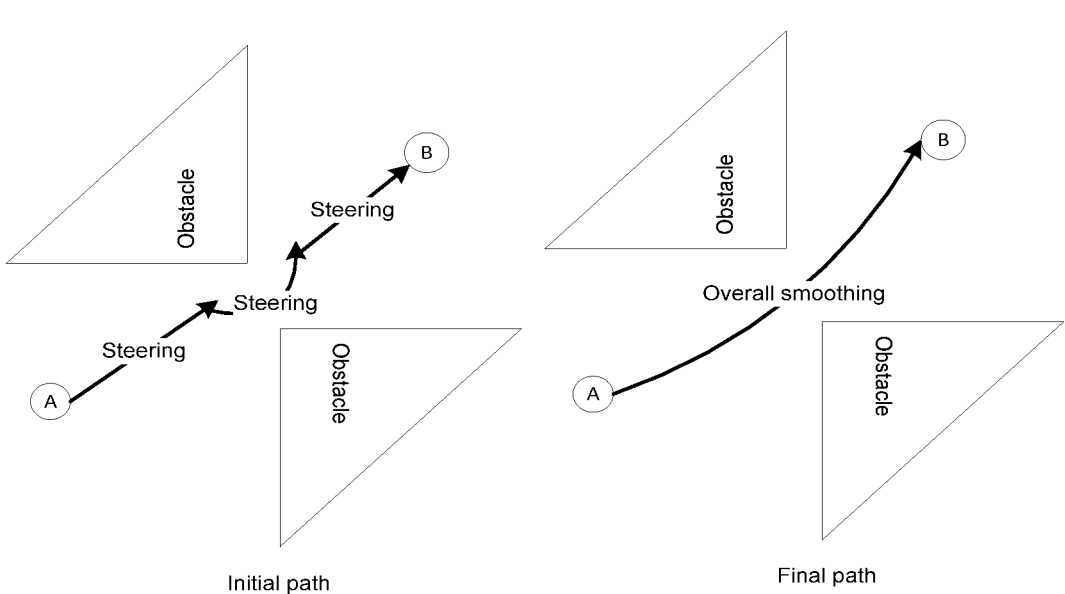
FIG. 3 is a schematic diagram of a comparison between an initial path and a final path provided in an embodiment of the present disclosure.

As shown in FIG. 3, it is a schematic diagram of a comparison between the initial path and the final path, wherein the start points of the initial path and the final path are both A, and the termination points of the initial path and the final path are both B. As can be seen from FIG. 3, when encountering an obstacle, the sweeping robot performs time-consuming actions such as steering in the vicinity of the obstacle on the initial path, and the planned path is unsmooth, such that a longer duration is consumed for walking, and the walking efficiency is low. However, the final path obtained in the present disclosure is smoother, thereby avoiding the in-situ steering action of acceleration and deceleration, enabling the walking to be smoother, and greatly improving the walking efficiency of the sweeping robot. Therefore, the steering problem of the sweeping robot while encountering the obstacle is improved, the overall operation efficiency of the sweeping robot is improved, and the situation in which the sweeping robot collides with the obstacle is avoided.

In some embodiments, the method further includes:

controlling the sweeping robot to move according to the final path.

In summary, the embodiment of the present disclosure provides a method for planning a path navigation, including: planning an initial path of a sweeping robot; performing obstacle detection on each path point on the initial path within a range of a first variable neighborhood, and recording a distance between the each path point and an obstacle; segmenting the initial path according to the distance between the each path point and the obstacle; calculating a path offset of a segmented initial path to obtain an offset path; and performing smoothing processing on the offset path to obtain a final path. In the present disclosure, by means of performing segmented deviation on an overall path of the sweeping robot, the sweeping robot can be more reasonably away from the obstacle during movement, such that the movement flexibility and the walking efficiency of the sweeping robot are improved, and a duration for the sweeping robot to arrive at the target point is shortened; and moreover, collisions between the sweeping robot and the obstacle can also be reduced, thereby protecting the body of the sweeping robot, improving the measurement precision of a sensor mounted on the sweeping robot, and reducing errors of the sensor, such that the path planning and navigation of the sweeping robot are more accurate.

Embodiment 2

Figure 4:
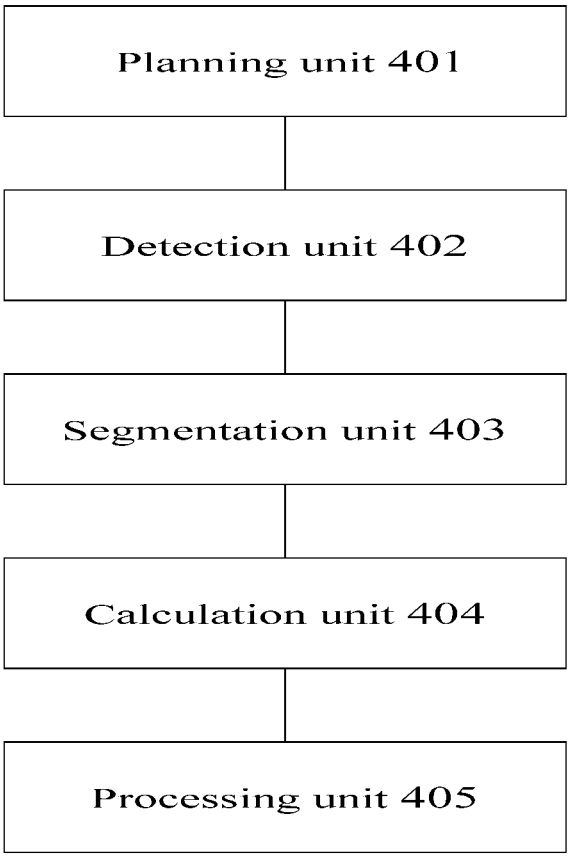
FIG. 4 is a schematic structural diagram of an apparatus for planning a path navigation provided in an embodiment of the present disclosure.

Based on the method for planning a path navigation disclosed in the embodiments of the present disclosure, FIG. 4 specifically discloses an apparatus for planning a path navigation applying the method for planning a path navigation.

As shown in FIG. 4, the embodiment of the present disclosure discloses an apparatus for planning a path navigation, wherein the apparatus includes:

a planning unit 401, configured to plan an initial path of a sweeping robot;

a detection unit 402, configured to perform obstacle detection on each path point on the initial path within a range of a first variable neighborhood, and recording a distance between the each path point and an obstacle;

a segmentation unit 403, configured to segment the initial path according to the distance between the each path point and the obstacle;

a calculation unit 404, configured to calculate a path offset of a segmented initial path to obtain an offset path; and a processing unit 405, configured to perform smoothing processing on the offset path to obtain a final path.

With regard to the specific working processes of the planning unit 401, the detection unit 402, the segmentation unit 403, the calculation unit 404 and the processing unit 405 in the path navigation planning apparatus disclosed in the embodiment of the present disclosure, reference may be made to corresponding content in the method for planning path navigation disclosed in the above embodiment of the present disclosure, and thus details are not described herein again.

In summary, the embodiment of the present disclosure provides an apparatus for planning a path navigation, including: planning an initial path of a sweeping robot; performing obstacle detection on each path point on the initial path within the range of a first variable neighborhood, and recording the distance between each path point and an obstacle; segmenting the initial path according to the distance between each path point and the obstacle; calculating a path offset of the segmented initial path to obtain an offset path; and performing smoothing processing on the offset path to obtain a final path. In the present disclosure, by means of performing segmented deviation on an overall path of the sweeping robot, the sweeping robot can be more reasonably away from the obstacle during movement, such that the movement flexibility and the walking efficiency of the sweeping robot are improved, and a duration for the sweeping robot to arrive at the target point is shortened; and moreover, collisions between the sweeping robot and the obstacle can also be reduced, thereby protecting the body of the sweeping robot, improving the measurement precision of a sensor mounted on the sweeping robot, and reducing errors of the sensor, such that the path planning and navigation of the sweeping robot are more accurate.

Embodiment 3

The present embodiment further provides a computer-readable storage medium, such as a flash memory, a hard disk, a multimedia card, a card-type memory (for example, an SD or DX memory, or the like), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disk, a server, an App Store and the like, a computer program is stored on the computer-readable storage medium, the computer program may, when being executed by a processor, implement the steps of the method in Embodiment 1, and details are not described in the present embodiment again.

Embodiment 4

Figure 5:
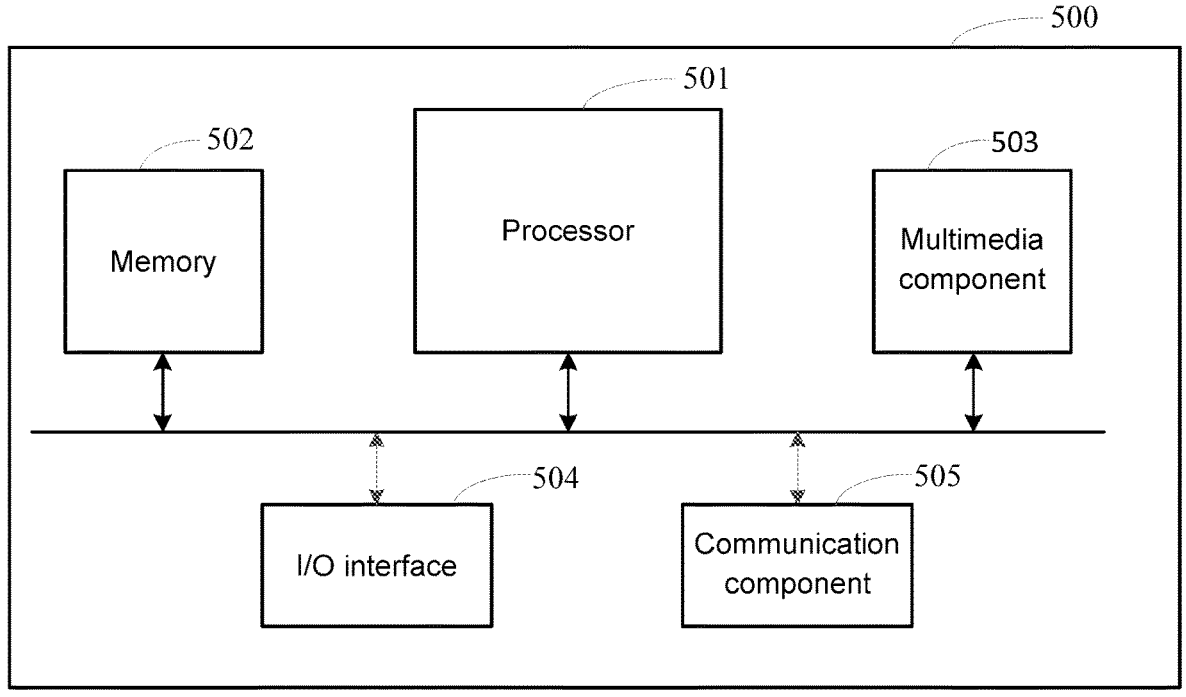
FIG. 5 is a connection block diagram of an electronic device provided in an embodiment of the present disclosure.

FIG. 5 is a connection block diagram of an electronic device 500 provided in an embodiment of the present disclosure, and as shown in FIG. 5, the electronic device 500 includes a processor 501, a memory 502, a multimedia component 503, an input/output (I/O) interface 504 and a communication component 505.

The processor 501 is used for executing all or some steps in the method for planning a path navigation in Embodiment 1. The memory 502 is used for storing various types of data, and these data may include, for example, instructions of any application program or method in the electronic device, and data related to the application program.

In some embodiments, the processor 501 is implemented by an application specific integrated circuit (Application Specific Integrated Circuit, ASIC for short), a digital signal processor (Digital Signal Processor, DSP for short), a digital signal processing device (Digital Signal Processing Device, DSPD for short), a programmable logic device (Program-mable Logic Device, PLD for short), a field programmable gate array (Field Programmable Gate Array, FPGA for short), a controller, a micro-controller, a microprocessor, or other electronic components, and is used for executing the method for planning the path navigation in Embodiment 1.

In some embodiments, the memory 502 is implemented by any type of volatile or non-volatile storage device or a combination of thereof, for example, a static random access memory (Static Random Access Memory, SRAM for short), an electrically erasable programmable read-only memory (Electrically Erasable Programmable Read-Only Memory, EEPROM for short), an erasable programmable read-only memory (Erasable Programmable Read-Only Memory, EPROM for short), a programmable read-only memory (Programmable Read-Only Memory, PROM for short), a read-only memory (Read-Only Memory, ROM for short), a magnetic memory, a flash memory, a magnetic disk, or an optical disk.

In some embodiments, the multimedia component 503 includes a screen and an audio component, the screen is a touch screen, and the audio component is used for outputting and/or inputting an audio signal. For example, the audio component includes a microphone, and the microphone is used for receiving an external audio signal. In some embodiments, the received audio signal is further stored in the memory or is sent by means of the communication component. The audio component further includes at least one speaker for outputting the audio signal.

In some embodiments, the I/O interface 504 provides an interface between the processor 501 and other interface modules, and the other interface modules are a keyboard, a mouse, a button, etc. These buttons may be virtual buttons or physical buttons.

The communication component 505 is used for performing wired or wireless communication between the electronic device 500 and other devices. The wireless communication is, for example, Wi-Fi, Bluetooth, near field communication (Near Field Communication, NFC for short), 2G, 3G, or 4G, or a combination of one or more thereof, therefore in some embodiments, the corresponding communication compo-nent 505 includes: a Wi-Fi module, a Bluetooth module and an NFC module.

In summary, the present disclosure provides a method for planning the path navigation and apparatus, a storage medium and an electronic device. The method includes: planning an initial path of a sweeping robot; performing obstacle detection on each path point on the initial path within the range of a first variable neighborhood, and recording the distance between each path point and an obstacle; segmenting the initial path according to the distance between each path point and the obstacle; calculating a path offset of the segmented initial path to obtain an offset path; and performing smoothing processing on the offset path to obtain a final path. In the present disclosure, by means of performing segmented deviation on an overall path of the sweeping robot, the robot can be more reasonably away from the obstacle during movement, such that the movement flexibility and the walking efficiency of the sweeping robot are improved, and a duration for the robot to arrive at the target point is shortened; and moreover, colli-sions between the sweeping robot and the obstacle can also be reduced, thereby protecting the body of the robot, improving the measurement precision of a sensor mounted on the robot, and reducing errors of the sensor, such that the path planning and navigation of the sweeping robot are more accurate.

In the several embodiments provided in the embodiments of the present disclosure, it should be understood that the disclosed method may also be implemented in other manners. The method embodiments described above are merely illustrative.

It should also be noted herein that, the terms "include", "contain" or any other variants thereof are intended to cover non-exclusive inclusions, such that a process, a method, an article or a device including a series of elements not only includes those elements, but also includes other elements that are not explicitly listed, or also includes elements inherent to such a process, method, article or device. If there are no more restrictions, the element defined by the sentence "including a . . . " does not exclude the existence of other identical elements in the process, the method, the article or the device that includes the element.

Although the embodiments disclosed in the present disclosure are as described above, the above content is merely embodiments provided for ease of understanding the embodiments of the present disclosure, and is not intended to limit the present disclosure. Any skilled in the art to which the present disclosure belongs may make any modifications and changes to the implementation forms and details without departing from the spirit and scope disclosed in the present disclosure, but the protection scope of the patent of the present disclosure is still subject to the scope defined by the appended claims.

What is claimed is:

1. A method for planning a path navigation, wherein the method comprises:

planning an initial path of a sweeping robot;

performing obstacle detection on each path point on the initial path within a range of a first variable neighborhood, and recording a distance between the each path point and an obstacle;

segmenting the initial path according to the distance between the each path point and the obstacle;

calculating a path offset of a segmented initial path to obtain an offset path;

performing smoothing processing on the offset path to obtain a final path; and controlling the sweeping robot to move according to the final path.

2. The method according to claim 1, wherein planning the initial path of the sweeping robot comprises:

determining a start point and a target point of a path to be planned of the sweeping robot; and according to the start point and the target point of the path to be planned of the sweeping robot, planning the initial path of the sweeping robot by means of a path planning algorithm.

3. The method according to claim 1, wherein performing obstacle detection on the each path point on the initial path within the range of the first variable neighborhood, and recording the distance between the each path point and the obstacle comprises:

sequentially performing obstacle detection within the range of the first variable neighborhood starting from the first path point of the initial path;

in a case that it is detected that there is an obstacle within the range of the first variable neighborhood of a certain path point, calculating the distance between the certain path point and the obstacle;

in a case that it is detected that there is no obstacle within the range of the first variable neighborhood of a certain path point, recording the distance between the certain path point and the obstacle to be a quadratic power of the radius of the first variable neighborhood; and finally, obtaining the distances between all path points and corresponding obstacles thereof.

4. The method according to claim 1, wherein segmenting the initial path according to the distance between the each path point and the obstacle comprises:

acquiring distances between a plurality of path points within a range of a second variable neighborhood of a current path point and corresponding obstacles thereof;

judging whether the distances between the plurality of path points and the corresponding obstacles thereof show a trend of changing from large to small and then changing from small to large;

in a case that the trend of changing from large to small and then changing from small to large occurs, recording, as an obstacle path point, a path point corresponding to the minimum distance among the distances between the plurality of path points and the corresponding obstacles thereof, and repeating above steps with a next path point as the current path point;

in a case that the trend of changing from large to small and then changing from small to large does not occur, repeating above steps with a next path point as the current path point;

sequentially executing above steps starting from the first path point of the initial path, so as to finally obtain a plurality of the obstacle path points; and segmenting the initial path according to the plurality of the obstacle path points.

5. The method according to claim 4, wherein calculating the path offset of the segmented initial path to obtain the offset path comprises:

for the plurality of the obstacle path points, calculating an offset distance d of each of the plurality of the obstacle path points on an initial position according to a formula:

$$d = \sqrt{R^2 + D^2} - D$$

calculating an offset distance dN of a path point between two endpoints of each segmented path on an initial position according to a formula:

$$d_N = \frac{N}{M}\left(\sqrt{R^2 + D^2} - D\right)$$

wherein R denotes the radius of the first variable neighborhood, D denotes the distance between the obstacle path point and the corresponding obstacle thereof, M denotes a total number of initial path points between the two endpoints of the segmented initial path, N denotes a serial number of a current initial path point among all the initial path points in the segmented initial path, both R and D are greater than 0, and both M and N are integers and greater than 0, the segmented initial path comprises a plurality of the segmented paths, each of the plurality of the segmented paths comprises a plurality of the initial path points;

determining a position of the obstacle path point after offset and a position of the initial path point between the two endpoints of the each segmented path according to the offset distances d and dN; and obtaining the offset path of the each segmented path according to the position of the obstacle path point after offset and the position of the initial path point between the two endpoints of the each segmented path.

6. The method according to claim 1, wherein performing smoothing processing on the offset path to obtain the final path comprises:

performing smoothing processing on the offset path by means of a B-spline curve, so as to obtain the final path.

7. A non-transitory computer-readable storage medium, wherein a computer program stored in the storage medium is executed by one or more processors, so as to implement a method for planning a path navigation, wherein the method comprises: planning an initial path of a sweeping robot; performing obstacle detection on each path point on the initial path within a range of a first variable neighborhood, and recording a distance between the each path point and an obstacle; segmenting the initial path according to the distance between the each path point and the obstacle; calculating a path offset of a segmented initial path to obtain an offset path; performing smoothing processing on the offset path to obtain a final path; and controlling the sweeping robot to move according to the final path.

8. The non-transitory computer-readable storage medium according to claim 7, wherein planning the initial path of the sweeping robot comprises:

determining a start point and a target point of a path to be planned of the sweeping robot; and according to the start point and the target point of the path to be planned of the sweeping robot, planning the initial path of the sweeping robot by means of a path planning algorithm.

9. The non-transitory computer-readable storage medium according to claim 7, wherein performing obstacle detection on the each path point on the initial path within the range of the first variable neighborhood, and recording the distance between the each path point and the obstacle comprises:

sequentially performing obstacle detection within the range of the first variable neighborhood starting from the first path point of the initial path;

in a case that it is detected that there is an obstacle within the range of the first variable neighborhood of a certain path point, calculating the distance between the certain path point and the obstacle;

in a case that it is detected that there is no obstacle within the range of the first variable neighborhood of a certain path point, recording the distance between the certain path point and the obstacle to be a quadratic power of the radius of the first variable neighborhood; and finally, obtaining the distances between all path points and corresponding obstacles thereof.

10. The non-transitory computer-readable storage medium according to claim 7, wherein segmenting the initial path according to the distance between the each path point and the obstacle comprises:

acquiring distances between a plurality of path points within a range of a second variable neighborhood of a current path point and corresponding obstacles thereof;

judging whether the distances between the plurality of path points and the corresponding obstacles thereof show a trend of changing from large to small and then changing from small to large;

in a case that the trend of changing from large to small and then changing from small to large occurs, recording, as an obstacle path point, a path point corresponding to the minimum distance among the distances between the plurality of path points and the corresponding obstacles thereof, and repeating above steps with a next path point as the current path point;

in a case that the trend of changing from large to small and then changing from small to large does not occur, repeating above steps with a next path point as the current path point;

sequentially executing above steps starting from the first path point of the initial path, so as to finally obtain a plurality of the obstacle path points; and segmenting the initial path according to the plurality of the obstacle path points.

11. The non-transitory computer-readable storage medium according to claim 10, wherein calculating the path offset of the segmented initial path to obtain the offset path comprises:

for the plurality of the obstacle path points, calculating an offset distance d of each of the plurality of the obstacle path points on an initial position according to a formula:

$$d = \sqrt{R^2 + D^2} - D$$

calculating an offset distance dN of a path point between two endpoints of each segmented path on an initial position according to a formula:

$$d_N = \frac{N}{M}\left(\sqrt{R^2 + D^2} - D\right)$$

wherein R denotes the radius of the first variable neighborhood, D denotes the distance between the obstacle path point and the corresponding obstacle thereof, M denotes a total number of initial path points between the two endpoints of the segmented initial path, N denotes a serial number of a current initial path point among all the initial path points in the segmented initial path, both R and D are greater than 0, and both M and N are integers and greater than 0, the segmented initial path comprises a plurality of the segmented paths, each of the plurality of the segmented paths comprises a plurality of the initial path points;

determining a position of the obstacle path point after offset and a position of the initial path point between the two endpoints of the each segmented path according to the offset distances d and dN; and obtaining the offset path of the each segmented path according to the position of the obstacle path point after offset and the position of the initial path point between the two endpoints of the each segmented path.

12. An electronic device, comprising a memory and a processor, wherein the memory stores a computer program, the memory and the processor are in communication connection with each other, and when executed by the processor, the computer program implements a method for planning a path navigation, wherein the method comprises: planning an initial path of a sweeping robot; performing obstacle detection on each path point on the initial path within a range of a first variable neighborhood, and recording a distance between the each path point and an obstacle; segmenting the initial path according to the distance between the each path point and the obstacle; calculating a path offset of a segmented initial path to obtain an offset path; performing smoothing processing on the offset path to obtain a final path; and controlling the sweeping robot to move according to the final path.

13. The electronic device according to claim 12, wherein planning the initial path of the sweeping robot comprises:

determining a start point and a target point of a path to be planned of the sweeping robot; and according to the start point and the target point of the path to be planned of the sweeping robot, planning the initial path of the sweeping robot by means of a path planning algorithm.

14. The electronic device according to claim 12, wherein performing obstacle detection on the each path point on the initial path within the range of the first variable neighborhood, and recording the distance between the each path point and the obstacle comprises:

sequentially performing obstacle detection within the range of the first variable neighborhood starting from the first path point of the initial path;

in a case that it is detected that there is an obstacle within the range of the first variable neighborhood of a certain path point, calculating the distance between the certain path point and the obstacle;

in a case that it is detected that there is no obstacle within the range of the first variable neighborhood of a certain path point, recording the distance between the certain path point and the obstacle to be a quadratic power of the radius of the first variable neighborhood; and finally, obtaining the distances between all path points and corresponding obstacles thereof.

15. The electronic device according to claim 12, wherein segmenting the initial path according to the distance between the each path point and the obstacle comprises:

acquiring distances between a plurality of path points within a range of a second variable neighborhood of a current path point and corresponding obstacles thereof;

judging whether the distances between the plurality of path points and the corresponding obstacles thereof show a trend of changing from large to small and then changing from small to large;

in a case that the trend of changing from large to small and then changing from small to large occurs, recording, as an obstacle path point, a path point corresponding to the minimum distance among the distances between the plurality of path points and the corresponding obstacles thereof, and repeating above steps with a next path point as the current path point;

in a case that the trend of changing from large to small and then changing from small to large does not occur, repeating above steps with a next path point as the current path point;

sequentially executing above steps starting from the first path point of the initial path, so as to finally obtain a plurality of the obstacle path points; and segmenting the initial path according to the plurality of the obstacle path points.

16. The electronic device according to claim 15, wherein calculating the path offset of the segmented initial path to obtain the offset path comprises:

for the plurality of the obstacle path points, calculating an offset distance d of each of the plurality of the obstacle path points on an initial position according to a formula:

$$d = \sqrt{R^2 + D^2} - D$$

calculating an offset distance dN of a path point between two endpoints of each segmented path on an initial position according to a formula:

$$d_N = \frac{N}{M}\left(\sqrt{R^2 + D^2} - D\right)$$

wherein R denotes the radius of the first variable neighborhood, D denotes the distance between the obstacle path point and the corresponding obstacle thereof, M denotes a total number of initial path points between the two endpoints of the segmented initial path, N denotes a serial number of a current initial path point among all the initial path points in the segmented initial path, both R and D are greater than 0, and both M and N are integers and greater than 0, the segmented initial path comprises a plurality of the segmented paths, each of the plurality of the segmented paths comprises a plurality of the initial path points;

determining a position of the obstacle path point after offset and a position of the initial path point between the two endpoints of the each segmented path according to the offset distances d and dN; and obtaining the offset path of the each segmented path according to the position of the obstacle path point after offset and the position of the initial path point between the two endpoints of the each segmented path.

17. The electronic device according to claim 12, wherein performing smoothing processing on the offset path to obtain the final path comprises:

performing smoothing processing on the offset path by means of a B-spline curve, so as to obtain the final path.

* * * * *